E. R. KLEMM.
VEHICLE.
APPLICATION FILED AUG. 16, 1919.
1,410,193.
Patented Mar. 21, 1922.
2 SHEETS—SHEET 1.
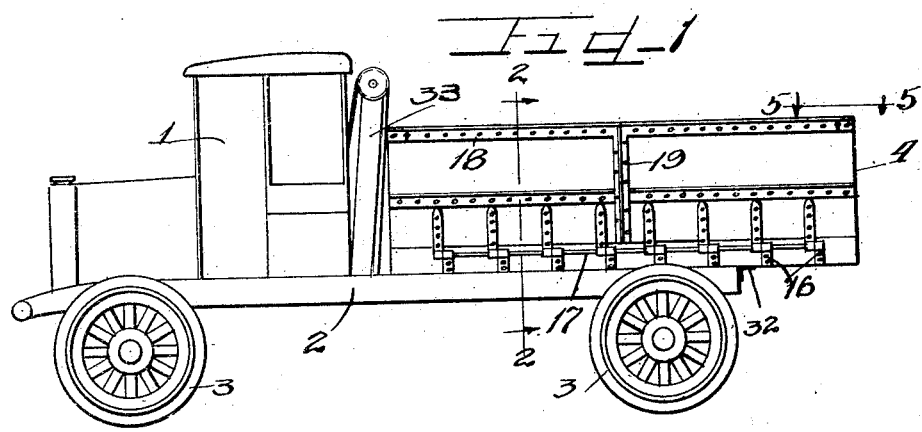
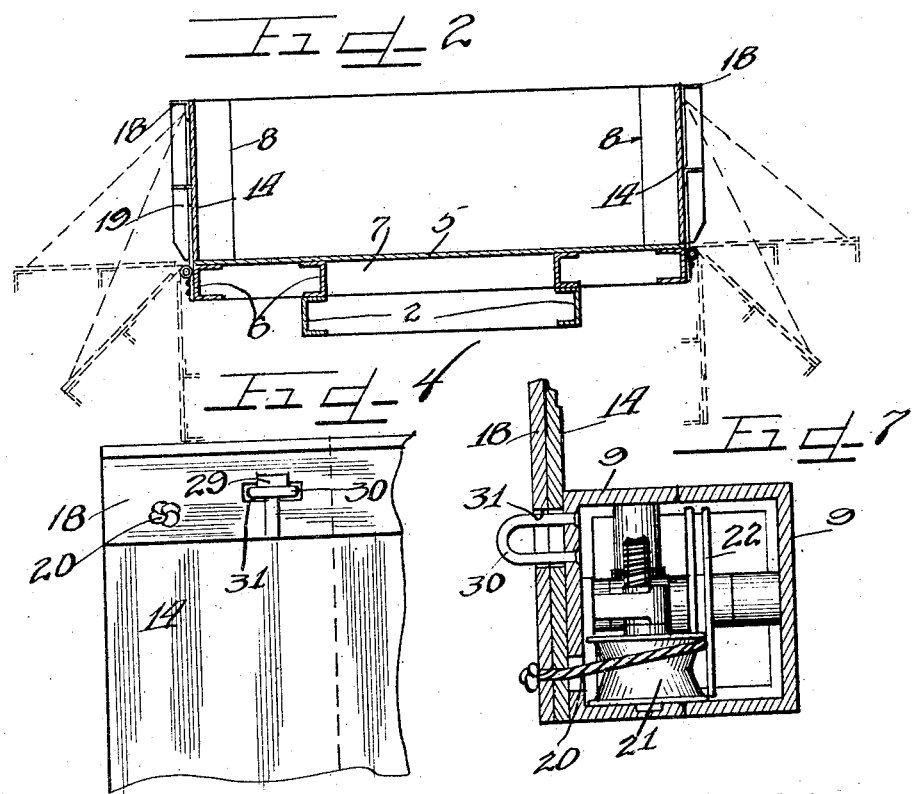

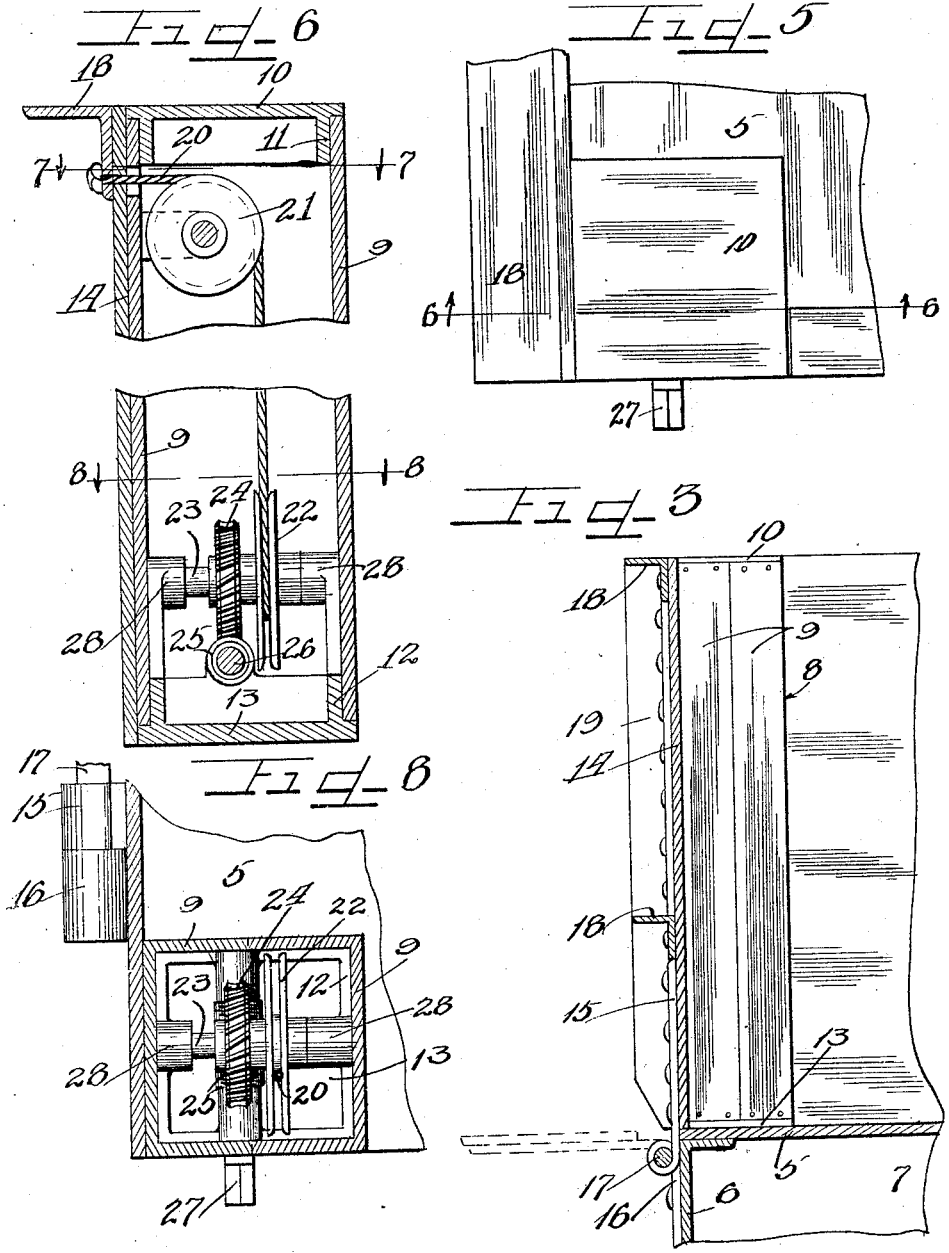

UNITED STATES PATENT OFFICE.

EMIL R. KLEMM, OF CHICAGO, ILLINOIS.

VEHICLE.

1,410,193.

Specification of Letters Patent. Patented Mar. 21, 1922.

Application filed August 16, 1919. Serial No. 317,870.

*To all whom it may concern:*

Be it known that I, EMIL R. KLEMM, a citizen of the United States, and a resident of the city of Chicago, in the county of Cook and State of Illinois, have invented certain new and useful Improvements in Vehicles; and I do hereby declare that the following is a full, clear, and exact description of the same, reference being had to the accompanying drawings, and to the numerals of reference marked thereon, which form a part of this specification.

This invention relates to vehicles and has especial reference to means for loading and unloading the contents thereof.

While the invention is not restricted to such use, it is particularly adapted for motor trucks for road transport.

In trucks as constructed heretofore the contents of the truck have been discharged at the end of the truck, frequently necessitating the backing of the truck up to the curb or unloading platform.

Further, when materials such as coal are being discharged, the front end of the truck body must be lifted to allow the coal to slide out of the rear end.

I have found that the time of unloading is greatly reduced by discharging the load of the truck laterally.

One of the principal objects of the invention, therefore, is to provide means for discharging the contents of a vehicle laterally without tilting the body.

A further object of the invention is to provide means for lowering one side of a vehicle to enable the contents of the vehicle to be discharged at that side.

Another object of the invention is to provide means for discharging a vehicle either rearwardly or laterally, as desired.

It is also an object of the invention to provide hinged sides on a vehicle adapted to be held in any desired angular position thereto for aiding in the discharge of material therefrom or in the transportation of material thereby.

Other and further important objects of this invention will be apparent from the disclosures in the specification and drawings.

The invention (in a preferred form) is illustrated in the drawings and hereinafter more fully described.

On the drawings:

Figure 1 is a side elevation of a truck embodying the invention.

Figure 2 is a section on the line 2—2 of Figure 1.

Figure 3 is an enlarged view of the left-hand part of Figure 2.

Figure 4 is a side elevation on an enlarged scale of the front upper corner of the truck body shown in Figure 1.

Figure 5 is a detail plan view taken on the line 5—5 of Figure 1.

Figure 6 is a section on the line 6—6 of Figure 5.

Figure 7 is a section on the line 7—7 of Figure 6.

Figure 8 is a section on the line 8—8 of Figure 6.

As shown on the drawings:

The invention is shown applied to a motor truck 1, having the usual chassis 2, supported by wheels 3. On the chassis is arranged a body generally designated as 4.

The body 4, comprises a bottom 5, preferably of sheet metal, stiffened by channel beams 6 and 7, arranged therebeneath. Corner-posts 8, are secured at their lower ends to the bottom 5. Each corner post 8, is formed of a pair of channels 9, with their flanges abutting each other as shown in Figure 8. These channels are connected by means of a cap 10, having a depending flange 11, secured to the web and flanges of each channel. Similarly the lower ends of the channels are secured to the flange 12 of a base 13.

The sides 14, of the body are connected to the side sills of the body by hinges comprising hinge straps 15 and 16, and rods or pintles 17 passing therethrough. The hinges are so located that when the sides are lowered into horizontal position their upper surface is substantially flush with that of the bottom 5, of the body to allow articles to be slid thereover. Longitudinal and vertical angle bars and T-bars 18 and 19, are provided for stiffening the sides 14.

Suitable means are provided for raising and lowering the sides such as the cables 20, secured to the upper angle bars 18, and passing over sheaves 21, arranged in the corner posts 8.

For winding and unwinding each cable a drum 22 is provided. Preferably the sides of this drum are spaced apart substantially the diameter of the cable to cause the latter to wind and unwind evenly thereon without the use of special guiding means.

This drum is mounted on a shaft 23, journalled in lugs 28, forming an integral part of the base 13, of the corner-post. On this shaft is also arranged a worm-wheel 24, in mesh with a worm 25, rigidly connected to a shaft 26, also journalled in the base 13. The projecting end of this shaft is squared, as at 27, for engagement with a suitable operating handle.

As the worm and worm-wheel drive is irreversible, the weight of the side 14 cannot turn the worm, so it is evident that the side 14 will remain in any angular position in which it is placed.

The sides are preferably locked in vertical position by means of pins 29, adapted to pass through staples 30, secured to the corner posts 8, and adapted to project through slots 31 in the sides 14.

The truck may also be provided with means for tilting the body of the truck by lifting its front end to discharge its contents rearwardly. For this purpose the bottom of the body is hinged to the chassis at 32, while a hoist 33, of any suitable construction is provided for raising the front end of the body.

The operation is as follows:

The truck is run alongside the curb where the coal or other material is to be unloaded, the pins 29, on the side adjacent the curb are withdrawn and the corresponding side 14 lowered by rotating the shafts 26. A large part of the coal or material will discharge by gravity as soon as the side is lowered and the remainder can be readily shovelled out. I have found it much quicker to empty a truck at the side in this way instead of at the end, since more material discharges laterally by gravity owing to the greater length of the sides than the end of the truck body. This not only leaves less material to be shovelled out but also provides a shorter distance over which the remaining coal has to be shovelled.

Where loading and unloading platforms are provided one of the sides 14 may be lowered onto the platform and the articles to be loaded or unloaded slid thereover.

Further, when the truck is to be used for transporting articles of great width the sides may be lowered into horizontal position as shown in Figure 2.

Further, the sides may be partially lowered to increase the carrying capacity of the truck when bulky and relatively light material such as hay is to be transported.

I am aware that numerous details of construction may be varied through a wide range without departing from the principles of this invention, and I therefore do not purpose limiting the patent granted otherwise than necessitated by the prior art.

I claim as my invention:

1. In a vehicle with movable side walls, hollow corner posts and hoisting mechanism for controlling the position of said walls, said mechanism including a drum on a shaft and driving gears housed in said posts on suitable bearings.

2. A drop side extension body for trucks including a floor, side and rear walls hinged to said floor, for motion through more than 180 degrees; a hollow vertical post at each corner of the floor for maintaining the side and rear walls in normally closed position, hoisting means for the side walls including a cable attached to the top thereof at each end, a pulley over which the cable is adapted to run, said pulley being positioned in the top of a hollow corner post, a winding drum for the cable mounted on a shaft in bearings in the bottom of each post, and a worm and gear drive on the shaft.

In testimony whereof I have hereunto subscribed my name in the presence of two subscribing witnesses.

EMIL R. KLEMM.

Witnesses:
EARL M. HARDINE,
CHARLES W. HILLS, Jr.